Figure 1:
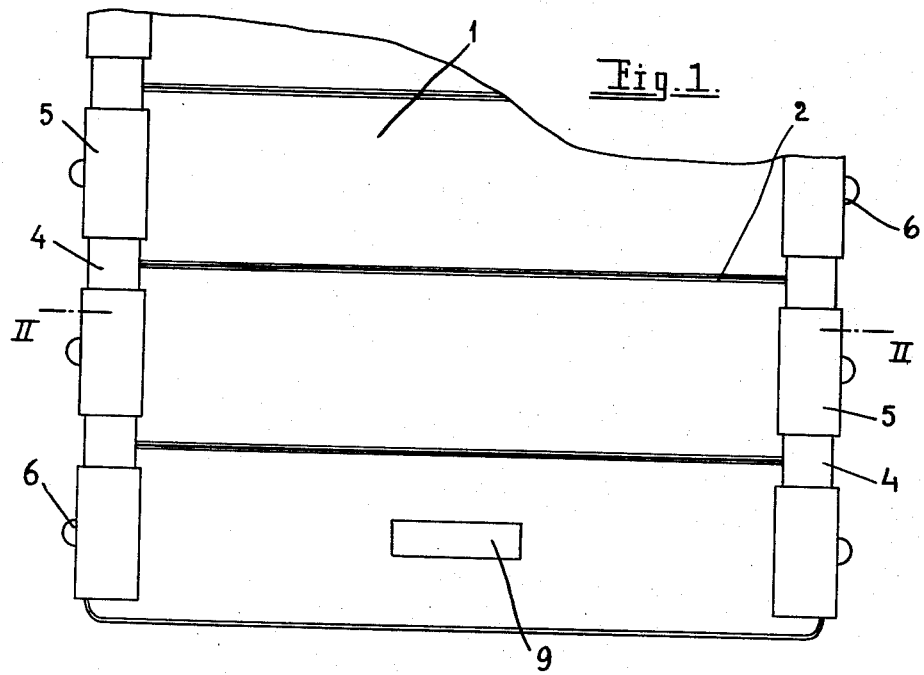

Aug. 1, 1939.   J. DRAGER   2,168,022

FLEXIBLE SCREEN

Filed July 19, 1938

Inventor
Johan Drager
by Michaelis & Michaelis,
attys.

Patented Aug. 1, 1939

2,168,022

UNITED STATES PATENT OFFICE 2,168,022

FLEXIBLE SCREEN

Johan Drager, Amsterdam, Netherlands

Application July 19, 1938, Serial No. 219,987
In the Netherlands July 22, 1937

6 Claims. (Cl. 312—190)

My invention relates to flexible screens or shutters of the type used in roll-top desks and more especially to a screen or shutter of the kind aforesaid, which is composed of transparent elements, preferably strips of glass which allow the contents of the case or other compartment closed by the shutter to be examined without opening the shutter.

In the screen or shutter according to this invention the transparent members forming the screen body are united in a manner such that while the transparent wall, which they form, is flexible, the elements constituting this wall are firmly connected with each other by means of connecting elements acting by friction, so that no perforation of the glass or other screen elements is required and the individual elements, if broken or otherwise damaged, can be readily replaced.

In the drawing affixed to this specification and forming part thereof a screen or shutter embodying my invention is illustrated diagrammatically by way of example.

In the drawing

Fig. 1 is a partial front elevation and

Figure 2:
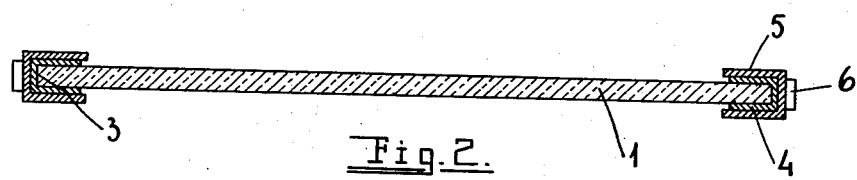

Fig. 2 a cross section on the line II—II in Fig. 1, while

Figure 3:
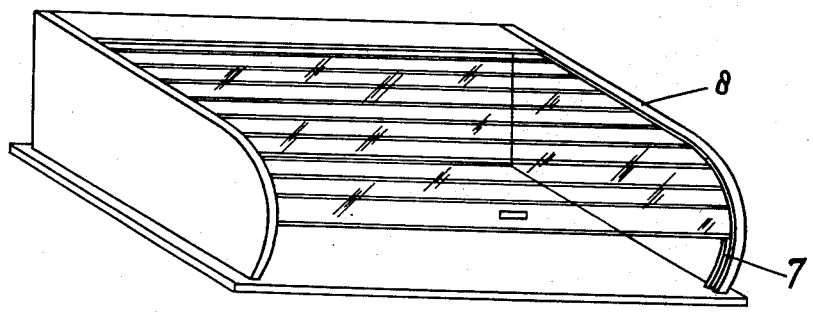

Fig. 3 is a perspective view illustrating by way of example a stationery case fitted with a shutter such as shown in Figs. 1 and 2.

Referring to the drawing and first to Figs. 1 and 2, 1, 1 are oblong plates or strips of transparent material, preferably transparent glass, alined to form the body of the screen or shutter. Their contacting longitudinal edges 2 are preferably bevelled or rounded so that adjoining strips or plates are enabled to turn about their longitudinal axes relative to each other. The lateral edge portions 3 of all the strips are covered with rubber strips 4 doubled-up U-fashion and held in place on the plates or strips 1 by means of U-shaped clips 5, preferably metal clips, the backs of which may be formed with rounded knobs 6, which might also be replaced by rollers.

Fig. 1 shows the manner in which the strips 1 are united by means of two doubled-up rubber bands held on the strips by means of the clips 5. Owing to the elasticity of the bands 4 the strip 1 are capable of turning relative to each other and, with the clips guided in curved grooves 7 of the side walls 8 of a case such as shown in Fig. 3, will be free to follow the curve prescribed by the curvature of the grooves, while being firmly held together by the combination of rubber bands 4 and metal clips 5, the knobs 6 merely serving to reduce the friction of the clips at the bottoms of the grooves.

9 is a handle fixed to the lowermost strip or plate.

Obviously any transparent material other than glass may be used in the construction of these shutters, but I wish it to be understood that I do not desire to be limited to transparent shutter elements, since the particular means for uniting them might as well prove useful in connection with non-transparent elements.

Various changes may be made in the details disclosed in the foregoing specification without departing from the invention or sacrificing the advantages thereof.

I claim:

1. In a flexible screen or shutter in combination, oblong strip elements alined in juxtaposition with their longitudinal edges adjoining each other, an elastic band or ribbon embracing the edge portions of the strip elements on either side thereof and means for holding said band or ribbon applied against said strip elements.

2. The flexible screen or shutter of claim 1, in which the bands or ribbons are held on the strip elements by mere friction.

3. The flexible screen or shutter of claim 1, in which the holding means comprises U-shaped metal clips which serve to press the elastic bands onto the edge portions of the strip elements.

4. The flexible screen or shutter of claim 1, in which the elastic bands or ribbons consist of rubber.

5. The flexible screen or shutter of claim 1, in which the holding means comprises clips formed with rounded projections on their backs.

6. The flexible screen or shutter of claim 1, in which a single pair of clips serves to hold each strip element between the two elastic bands.

JOHAN DRAGER.